Patented Nov. 3, 1942

2,300,564

UNITED STATES PATENT OFFICE 2,300,564

PROCESS OF PURIFYING WATER AND COMPOSITION THEREFOR

Earl Vincent Godfrey, Philadelphia, Pa., assignor of one-half to Joseph A. Rossi, Cynwyd, Pa.

No Drawing. Application May 7, 1940,
Serial No. 333,766

2 Claims. (Cl. 210—23)

This invention relates to a process and composition of matter for sterilizing, purifying and softening water for household use, swimming pools, industrial and technical purposes.

Important objects of the invention are to provide a process and composition of this character which shall be simple, economical and shall effectively purify and soften water; and to provide such a process and composition whereby the treated water shall be free from obnoxious odors or flavor, shall be harmless to persons who drink the water, and shall have no tendency to bleach the hair or clothing which may be wet with the water.

I have discovered that these and other objects and advantages, as will later appear herein, can be achieved by treating water to be purified with a mixture of potassium chlorate ($KClO_3$) and a solution of ferric chloride ($FeCl_3$) U. S. P. which contains free hydrochloric acid (HCl).

Reference to the latest edition (1935) of the United States Pharmacopoeia, i. e. U. S. P. XI, will show that such a solution of ferric chloride includes not less than 3% and not more than 5% hydrochloric acid.

The same United States Pharmacopoeia requires that the solution contain ferric chloride corresponding to not less than 10% and not more than 11% iron. To meet these requirements, the following formula should be followed in the manufacture of the ferric chloride:

| | Grams |
|---|---|
| Iron, in the form of fine, bright wire and cut into small pieces | 125 |
| Hydrochloric acid | 680 |

Nitric acid, } each, a sufficient quantity
Distilled water } to make _____ 1000

Introduce the iron into a flask having a capacity of about 2000 cc., pour upon it a mixture of 420 grams of hydrochloric acid and 250 cc. of distilled water and heat the mixture on a water bath for not less than one hour and fifteen minutes, or until effervescence ceases; then boil the liquid, filter it through paper, and, having rinsed the flask and iron wire with a little hot distilled water, pass the rinsings through the filter. To the filtered liquid add 220 grams of hydrochloric acid, then add the mixture slowly and gradually in a stream to 65 grams of nitric acid contained in a tared, capacious porcelain vessel, and warm gently. If the solution has acquired a black color, continue the addition of nitric acid, drop by drop, until red fumes no longer are evolved and the solution assumes a clear, reddish brown color. After effervescence ceases, heat on a sand bath, stirring occasionally until the liquid is free from nitric acid, according to such test as is known to chemists familiar with such acids. During the heating, add distilled water from time to time to maintain about the original volume. Finally add the remaining 40 grams of hydrochloric acid and enough distilled water to make the solution weigh 1000 grams.

In the first step of the process, ferrous chloride is produced; thus:

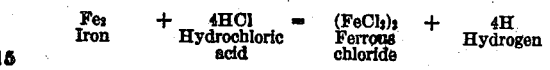

Ferrous chloride is converted into ferric chloride by the addition of nitric acid and hydrochloric acid; thus:

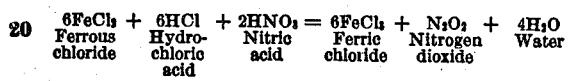

If this solution, when finished, has a black color, it is due to incomplete oxidation, and the remedy is to heat it to boiling in a capacious dish, adding a few drops of nitric acid until the color changes to a clear ruby-red and effervescence ceases. If a brown precipitate is deposited upon dilution or standing, deficiency of hydrochloric acid is indicated, and the solution must be heated, and a few drops of the acid added until the precipitate is dissolved; but an excess of hydrochloric acid must be avoided.

Specifically describing one example of my process and composition, about two hundred thirty-one and one-half (231½) grains or sixteen (16) grams of potassium chlorate is added to about one (1) pint or five hundred (500) cubic centimeters of ferric chloride solution (U. S. P.) and thoroughly mixed. Then three (3) drops of this mixture is added to each gallon of water to be purified, with thorough agitation or stirring of the water. The treated water is then allowed to stand until precipitation and coagulation is complete. Generally twenty-four hours is sufficient. Thereafter, the water is filtered to remove the precipitates and solid matter. Where small quantities of water are being purified, the filtration may be performed with filter paper, but for large quantities of water, it is preferable to filter through sand. The whole process may be performed at ordinary temperatures, and preferably in daylight. The composition can be added to the water in reservoirs, tanks and swimming pools.

During the treatment a chemical reaction occurs thus:

$$2KClO_3 + 4HCl = 2KCl + 2ClO_2 + Cl_2 + 2H_2O$$

The chlorine dioxide ($ClO_2$), a strong oxidizer, and the free chlorine (Cl) are liberated or produced as the result of chemical reaction directly in the water, and effectually cause oxidation and destruction of the animal, vegetable and other harmful matter that is present in the water being treated. The purified water is free from obnoxious odors and unpleasant flavors, and the nature of the process and composition and the results thereof, are harmless to persons who may drink the purified water. Furthermore, the water does not have any tendency to bleach the hair or clothing that may be wet with the water.

While the nature of the action of the ferric chloride is not exactly understood, it appears that the ferric chloride assists in the coagulation and precipitation and also enhances and prolongs the oxidation phases of the process.

It will be understood by those skilled in the art that modifications can be made in the proportions of the potassium chlorate and ferric chloride and in the steps of the process without departing from the spirit or scope of the invention.

Having thus described my invention, what I claim is:

1. The process of sterilizing and purifying water which consists in adding to each gallon of water to be purified about three (3) drops of a mixture consisting of about sixteen (16) grams of potassium chlorate and about five hundred (500) cubic centimeters of a solution of ferric chloride U. S. P. which contains not less than three (3%) per cent and not more than five (5%) per cent free hydrochloric acid, and agitating the water containing said mixture.

2. A composition of matter for the purification of water consisting of a mixture of about sixteen (16) grams of potassium chlorate and about five hundred (500) cubic centimeters of a solution of ferric chloride U. S. P. which contains not less than three per cent (3%) nor more than five per cent (5%) of free hydrochloric acid.

EARL VINCENT GODFREY.